INVENTORS.
RUDI M. SCHROEER
THOMAS A. GARMHAUSEN
BY
ATTORNEYS.

United States Patent Office 3,369,389
Patented Feb. 20, 1968

3,369,389
THERMAL TESTING APPARATUS
Rudi M. Schroeer and Thomas A. Garmhausen, Yellow Springs, Ohio, assignors to Arvin Industries, Inc., Columbus, Ind., a corporation of Indiana
Filed Oct. 9, 1964, Ser. No. 402,841
11 Claims. (Cl. 73—15)

ABSTRACT OF THE DISCLOSURE

A thermal testing apparatus comprising a probe having a heat source and a plurality of sensing elements, the latter sensing the heat transmitted through a work-piece from a localized area heated by said heat source. Said sensing elements are wired in parallel and are connected to a measuring circuit for determining the average rate of temperature change through said work-piece.

---

This invention relates to an apparatus for measuring the quality of physical contact between two or more pieces of material. For example, it is useful in measuring the quality of bonds between pieces of material which may be fused together by processes such as welding, soldering, and the like.

It is an object of the invention to provide a testing apparatus which will measure the thermal conductivity of a work-piece, which will give accurate and rapid measurement readings, which can be used on relatively small work-pieces, and which can be used on work-pieces of irregular contour.

According to one form of the invention, there is provided a heat sensing probe comprising a housing having a spring-loaded electrode connected to a low voltage power supply. A plurality of heat sensing elements are also spring-loaded within the housing and project outwardly therefrom with their outer ends disposed in the same general plane as the end of the electrode. A plurality of tubes are disposed around the electrode with their discharge ends interposed between said electrode and the sensing elements. Said tubes are interconnected to a source of air under pressure so that they will discharge streams of air between the electrode and sensing elements to cool the electrode after a test is made and before a new test is made. Conveniently, a plurality of adjustable stops project outwardly from the probe for limiting movement of the electrode and sensing elements when the probe is placed in operative position with said electrode and sensing elements bearing against a work-piece.

In operation, one side of the power supply for the electrode is connected to said electrode and the other side of said power supply is connected to the work-piece to be tested. The sensing elements, which are wired in parallel to sense the average temperature of the work-piece around the electrode, are connected to a measuring circuit. Said sensing elements form one branch of a Wheatstone bridge in the circuit, with said bridge being connected to a power supply. The output of the bridge is fed into a differentiating amplifier circuit containing a meter for measuring the rate of change of the temperature of the work-piece immediately adjacent the point of contact of the electrode on said work-piece.

If two pieces of metal are intimately bonded together, as by a high quality weld joint, the heat applied to one of said pieces of metal from the electrode will be quickly dissipated into the second piece of metal. If, on the other hand, there is poor quality weld joint interconnecting the two pieces of metal, the heat applied to one of said pieces of metal by said electrode will not be quickly dissipated into the second piece of metal so that the temperature of the piece of metal to which the electrode is applied will rise rapidly. Therefore, if the meter in the measuring circuit indicates that there is a relatively slow rate of temperature increase in the piece of metal to which the electrode is applied, the interconnection between the two pieces of metal constitutes an intimate interconnection, as a good weld joint. If, on the other hand, there is a rapid rate of temperature increase in the piece of metal to which the electrode is applied, then the heat emanating from the electrode is not being conducted into the second piece of metal at a rapid rate and there is not intimate interconnection between the two pieces of metal, as poor weld joint.

Other objects and features of the invention will become apparent from the more detailed description which follows and from the accompanying drawings, in which.

For ease in description, the use of the instant invention will herein be described for measuring the quality of a weld joint between two pieces of metal constituting the work-piece. It is to be understood, however, that the invention can be employed to measure the intimacy with which two pieces of metal are interconnected irrespective of their methods of interconnection.

A good weld will prvide a significantly better heat transfer medium than a bad weld. If heat is applied to the surface of a spot weld bonding two pieces of metal together, the heat will be conducted throughout the two pieces in a hemispherical pattern. Two general directions of the heat flow pattern are of significant interest—the heat flow laterally in all directions from the weld through the surface of the first piece of metal; and the downward flow of heat through the weld column to the second piece of metal. The proportion of the quantity of heat transferred laterally to that transferred downwardly changes significantly from good to bad welds. A poor weld bond will not provide as efficient a downward heat transfer medium as a good weld. Therefore, a great amount of heat will be transferred laterally in the first piece of metal to which the heat is applied in the case of a bad weld. By heating the weld surface under controlled conditions, specific measurement values for good and bad welds can be established for measuring the rate of heat change in the piece of metal to which the heat is applied for a given instant of time during the heat application cycle. The instant invention is therefore concerned with the meaurement of the rate of heat change applied to a piece of material connected to another piece of material for determining the quality or the intimacy of the interconnection between the two pieces of material.

Figure 1:
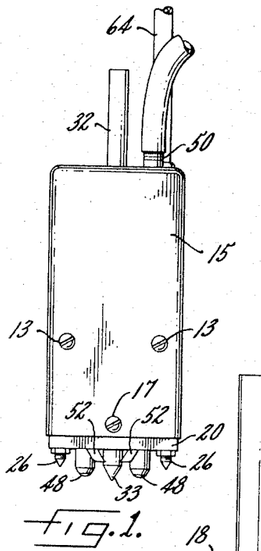
FIG. 1 is a side elevation of a heat sensing probe embodying the invention.
Figure 2:
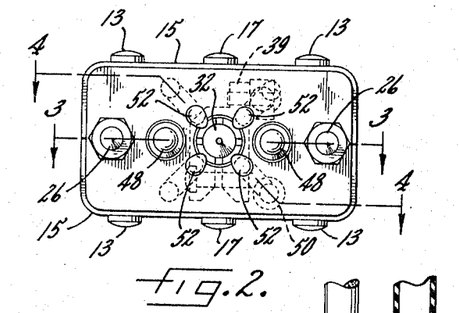
FIG. 2 is an end elevation of the probe shown in FIG. 1.
Figures 5, 6, 7:
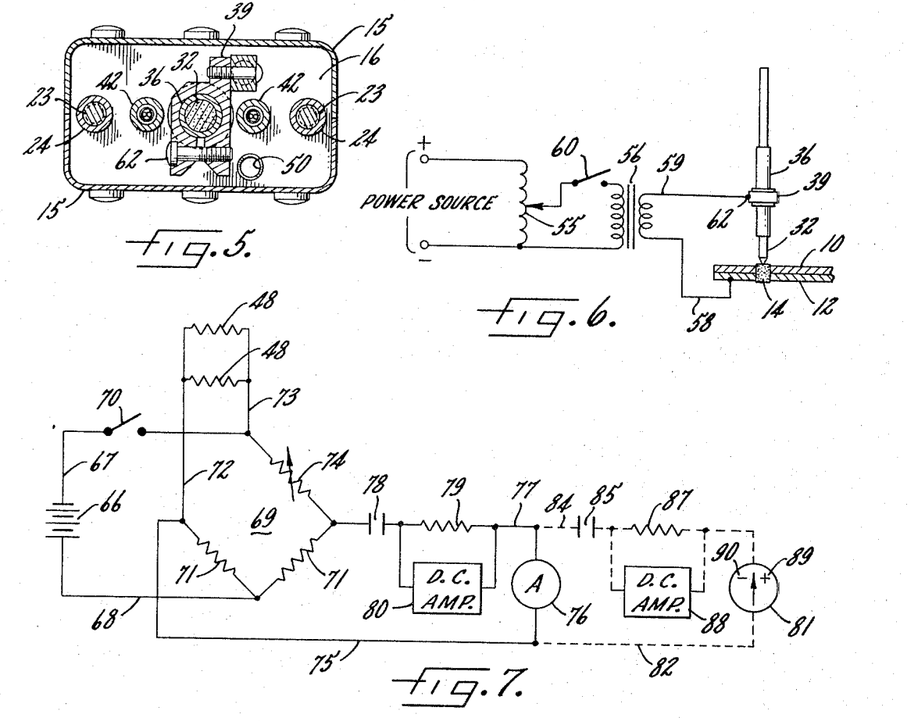
FIG. 5 is a transverse section taken on the line 5—5 of FIG. 3.
FIG. 6 is a wiring diagram for the electrode shown in FIG. 1.
FIG. 7 is a wiring diagram of the electrical measuring circuit for use with the probe shown in FIG. 1.

The instant invention comprises a sensing probe, an embodiment of which is illustrated in FIG. 1 and a measuring circuit illustrated in FIG. 7. The probe is adapted to be placed against the work-piece for measuring its thermal conductivity. Said work-piece may comprise a first piece of metal 10 rigidly bonded to a second piece of metal 12 by a weld column 14. The probe comprises a housing formed from a pair of opposed shells 15 connected by screws 13 to support block 16 formed of electrically insulating material. The shells 15 are bent inwardly at one of their ends, as at 18, to enclose one end of the housing. The opposite end of said housing is enclosed by an end block 20 formed of electrically insulating material and connected to the shells by the screws 17. The block 16 is provided with a pair of shouldered openings 22 for the reception of bolts 23 which extend forwardly through spacers 24 and are received in the rearward portions of openings 25 formed in the block 20. As the bolts 23 are drawn up the ends of the spacers 24 will abut the adjacent faces of the blocks 16 and 20 to secure the blocks in the desired spaced relationship. A pair of limit screws 26 are adjustably received in the forward ends of the block openings 25 and project outwardly therefrom for limiting the minimal spacing between the metal sheet 10 and the adjacent end of the housing. Conveniently, each of the screws 26 is held in the desired position of adjustment up by a locknut 28 received thereon and drawn up against the outwardly presented face of the block 20.

Figure 3:
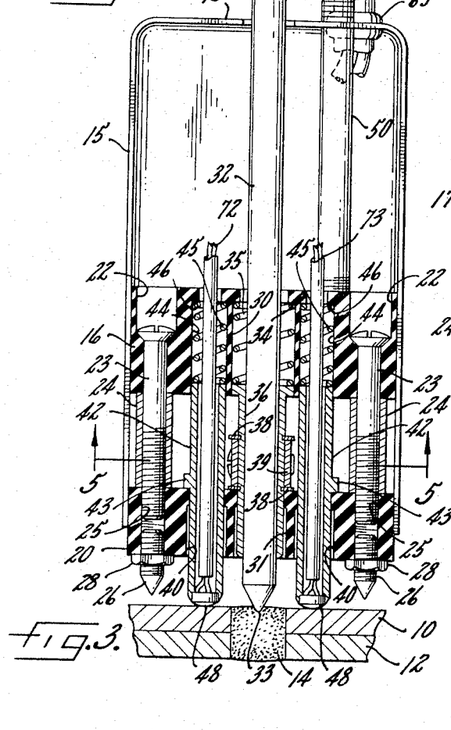
FIG. 3 is a longitudinal section taken on the line 3—3 of FIG. 2.
Figure 4:
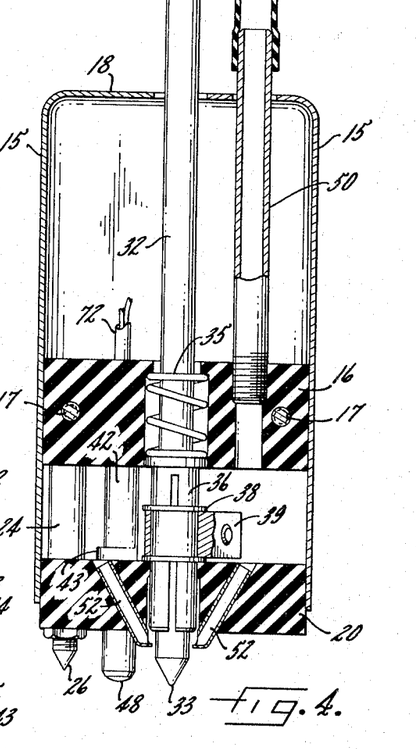
FIG. 4 is a longitudinal section taken on the line 4—4 of FIG. 2.

The blocks 16 and 20 have centrally located, aligned openings 30 and 31 formed therein for the reception of an electrode 32 having a pointed tip 33 engageable with the weld column to be tested, as the column 14. The electrode is formed of material having a high electric resistivity and low heat conductivity, such as for example "Inconel," platinum-iriduim, or the like. The rear end of the opening 30 is shouldered at 34 to form a seat for a coil spring 35 disposed around the electrode 32 and having its opposite end bearing against a metal bushing 36 slidably received in the opening 31 in the end block 20. A pair of retainer rings 38 are received in annular grooves in the bushing 36 and are disposed on opposite sides of a terminal clamp 39 bindingly mounted on said bushing and bindingly retaining the electrode in a fixed position in the bushing. The spring 35 biases the electrode point 33 outwardly from the end block 20, with the outward movement of said electrode being limited by the forward retainer ring 38 bearing against the rear face of said block.

The block 20 is provided with a pair of openings 40 interposed between the openings 25 and the central opening 31, and equidistant from the opening 31. An elongated sleeve 42 formed of electrically insulating material is slidably received in each of the openings 40 and projects outwardly beyond the forward face of the end block 20. Intermediate its length, each of the sleeves 42 has an outwardly projecting shoulder 43 engageable with the rear face of the block 20. The rearward end of each sleeve 42 is slidably carried in an opening 44 in the block 16 and bears against a coil spring 45 carried in the opening 44 with its rearward end seated against a shoulder 46 formed at the rear of said opening. Each of the sleeves 42 has a thermal sensing element 48 at its forward end which is carried in a spring loaded position against the work-piece sheet 10 by the spring 45. Any convenient type of thermal sensing element 48 can be employed, such as for example, a thermistor whose electrical resistivity decreases with an increase in temperature.

A conduit 50 connected to a suitable source of air under pressure extends through the housing and the block 16 to dispose its discharge end in the space between the blocks 16 and 20. A plurality of tubes 52 are mounted in the block 20 in radially spaced relationship to the electrode opening 31. The rearward ends of the tubes 52 are in open communication with the space between the blocks 16 and 20 and the forward discharge ends of said tubes project outwardly beyond the front face of the block 20. The tubes 52 converge forwardly toward the electrode tip 33 to discharge a stream of air around the electrode for rapidly cooling the electrode after a heating cycle so that a new cycle can be quickly started.

As shown in FIG. 6, power for the electrode 32 is supplied from a power source through an adjustable transformer 55 and step-down transformer 56, with a manually operated switch 60 interposed therebetween. One line 58 of the take-off from the transformer 56 is connected to either the sheet 10 or 12 of the work-piece. The other line 59 of the take-off from the transformer is connected by a screw 62 to the clamp 39 on the electrode supporting bushing 36. In this manner, a completed circuit is established through the electrode 32, the work-piece, and the line 58 so that the electrode tip 33 will generate heat on the weld column 14. As shown in FIG. 1, the line 59 is carried into the probe housing through a conduit 64 mounted in a grommet 65 carried in one of the shell end walls 18.

The measuring circuit for the apparatus is illustrated in FIG. 7 and comprises a power source 66 connected to a pair of lines 67 and 68 connected to a Wheatstone bridge 69, the line 67 being provided with a switch 70. Two legs of said bridge are provided with fixed resistances 71. A third side of said bridge comprises the sensing elements 48 which are wired in parallel with each other to give an average temperature reading laterally outwardly from the weld column 14 and which are connected to the bridge by lines 72 and 73. Conveniently, the lines 72 and 73 extend through the conduit 64 for connection to the sensing elements in the probe. The fourth side of the bridge is provided with an adjustable resistance 74 to give a zero reading at ambient temperature across the bridge. A line 75 is connected to one side of the bridge and to one side of an ammeter 76. The opposite side of said ammeter is connected by a line 77 to said bridge. Interposed between the ammeter 76 and the bridge in the line 77 is a differentiating amplifier circuit comprising a capacitor 78 and a direct current amplifier 80 with a feedback resistor 79 wired in parallel with the amplifier, said resistor determining the gain of the differentiating circuit.

Thus, when the electrode 32 is energized, it will supply heat to the weld column 14. The sensing elements 48 will become heated to a lesser or greater degree depending upon the quality of the weld column 14 to cause their electrical resistance to change to provide a meter reading at 76. The differentiating amplifier circuit thereby provides a measurement of the average of the rate of change of temperature at the locations of the sensing elements 48 on the work-piece sheet 10 within one second for determining the quality of the weld column 14.

Figure 8:
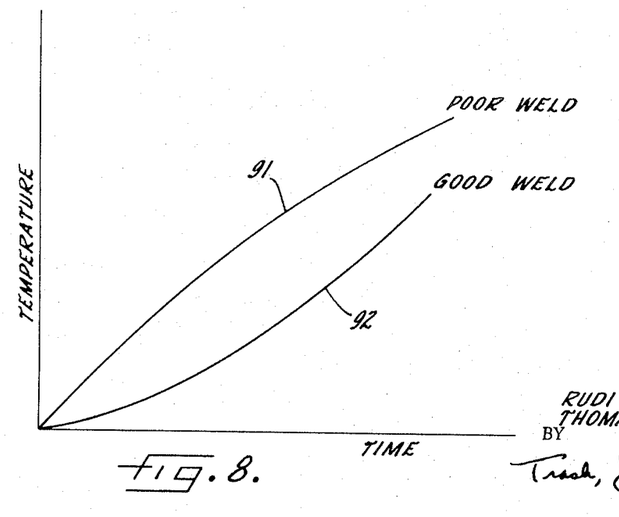
FIG. 8 is a graph showing the plots of welds made with the invention.

As shown in FIG. 8, a poor quality weld will produce the curve 91 because the weld column 14 does not efficiently conduct the heat away from the electrode tip 33 thereby causing a rapid lateral temperature rise in the work-piece sheet 10. If a good quality weld is provided by the column 14, a substantially greater percentage of the heat from the electrode tip 33 will be conducted to the work-piece sheet 12, and the temperature of the work-piece sheet 10 will not rise as rapidly so that the temperature of the work-piece sheet 10 at the sensing elements 48 will provide a curve 92. This rate of change of temperature or differential quotient $dI/dt$ represents the tangent of the plot, temperature versus time, and changes continuously during the heat transfer and is larger for a bad weld than for a good weld. The bad weld quotient has its highest magnitude at the beginning of the test and then decreases, while a good weld connection shows a gradual increase in the quotient. Using our invention it is thus not necessary to wait for temperature equillibrium at the elements 48 or even to wait at least several seconds until sufficient temperature increasing occurs.

In many cases, the plots of good and bad welds differ not only with respect to the rate of change, but also with respect to the sign of rate of change. A good weld shows an increase while a bad weld shows a decrease of rate of change with time. In orfder to determine whether the rate of change is increasing or decreasing, a second amplifying circuit can be connected in parallel across the meter 76 by lines 82 and 84. As shown in FIG. 7, the line 84 is connected to a capacitor 85 in series with a direct current amplifier. A resistance 87 is wired in parallel with the amplifier. The lines 82 and 84 are connected across ammeter 81 provided with indicia 89 and 90 for indicating whether the rate of temperature change is increasing (positive) or decreasing (negative).

A modified form of the sensing probe is shown in FIGS. 9–12. Said probe is provided with a housing comprising a pair of opposed shells 94 provided with vent openings 95 and closed at their rearward ends as at 96. The shells 94 are connected by a plurality of screws 98 to three longitudinally spaced support blocks 99, 100, and 101, the block 101 enclosing the forward end of the probe housing. A bracket 102 is mounted in the housing by a screw 103 and supports a high current low voltage bulb 104 which serves as the heat source for the probe. An elliptical reflector 105 is disposed around the bulb 104 for directing the energy therefrom forwardly through the housing. Said reflector is provided with legs 106 connected to one of the housing shells 94 by bolts 107 for supporting the reflector in the housing around the bulb 104. Desirably, the reflector 105 has a plurality of rearwardly projecting cooling fins 108 projecting rearwardly around the bracket 102.

Figures 9, 10, 11, 12:
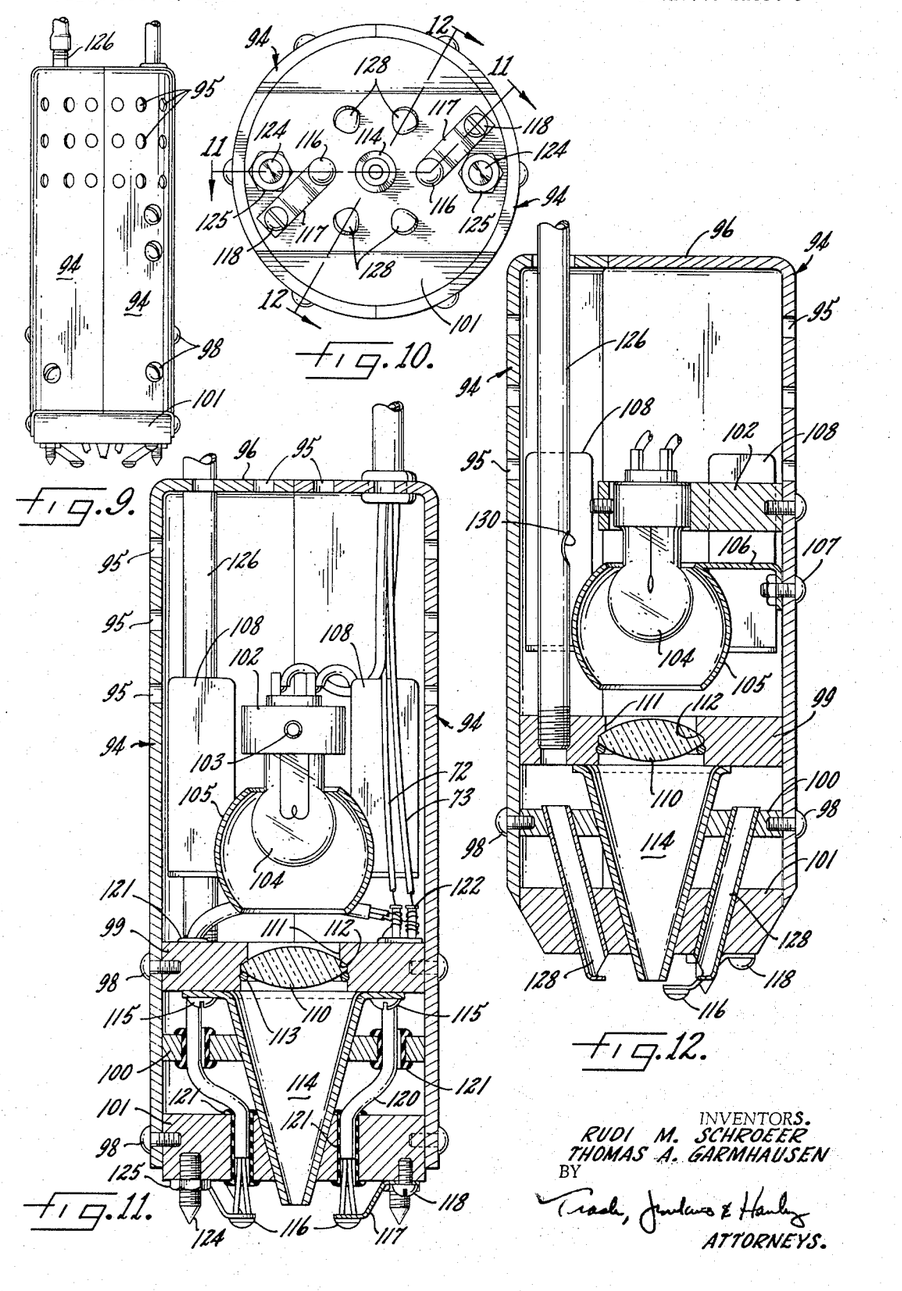
FIG. 9 is a side elevation of modified form of the probe shown in FIG. 1.
FIG. 10 is an end view of the probe shown in FIG. 9.
FIG. 11 is a longitudinal section taken on the line 11—11 of FIG. 10.
FIG. 12 is a longitudinal section taken on the line 12—12 of FIG. 10.

The forward end of the reflector 105 is disposed in axial alignment with a lens 110 carried in an opening 111 formed in the block 99. Conveniently, said lens is carried against a shoulder 112 in the opening 111 by an O-ring seal 113. A frustoconical reflective shield 114 is mounted on the forward face of the block 99 in alignment with the lens 110 by screws 115 with a portion of said shield projecting through and being supported by openings formed in the blocks 100 and 101. Thus, the heat energy from the bulb 104 will be reflected by the reflector 105 to the lens 110, whereupon it is focused through the reflective shield 114 onto the weld column to be tested.

A pair of thermal sensing elements 116, as for example, thermistors, are carried forwardly of the block 101 on opposite sides of the forward end of, and equidistant from, the shield 114 in a pair of outwardly biased spring brackets 117 mounted on the forward face of the block 101 by screws 118. The wires 120 leading from the elements 116 are carried in grommets 121 disposed in openings formed in the blocks 101, 100, and 99, with the opposite ends of the wires 120 being connected through stand-off terminals 122 to the lines 72 and 73 in the indicating circuit shown in FIG. 7 for measuring, in the same manner as previously discussed, the rate of temperature increase of the work-piece when the bulb 104 is energized. The spring brackets 117 bias the elements 116 outwardly to engage the surface of the work-piece whose temperature is to be measured, but to prevent said clamps from being distorted inwardly by an excessive pressure being applied to the work-piece, a pair of adjustable limit screws 124 are mounted in the forward face of the block 101 and are releasably retained in the desired position of adjustment by lock nuts 125 received in the screws 124 and bearing against the block 101.

In order to concentrate the heat projected from the shield 114 onto the work-piece and to insulate the elements 116 from the end of said shield, an air conduit 126 is connected to a suitable source of air under pressure and projects through one of the shells 94 and block 99 to dispose its discharge end in the space between the blocks 99 and 100. A plurality of forwardly converging air tubes 128 are mounted in the blocks 100 and 101 with their rearward ends in open communication with space between the blocks 99 and 100 and their forward ends disposed immediately forwardly of the block 101 adjacent the forward end of the shield 114. The conduit 126 is also provided with an opening 130 rearwardly of the block 99 to cause air to flow around the bulb 104 and reflector 105 for discharge out the openings 95 so as to prevent the housing from becoming overheated.

Figure 13:
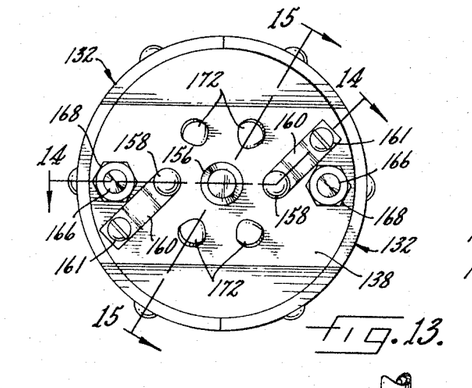
FIG. 13 is an end elevation of a modified form of the probe shown in FIG. 1.
Figure 14:
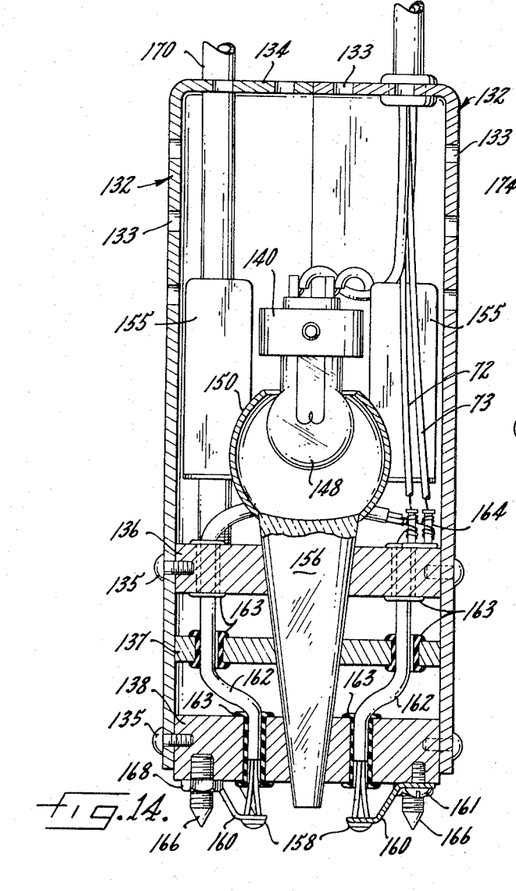
FIG. 14 is an enlarged longitudinal section taken on the line 14—14 of FIG. 13.
Figure 15:
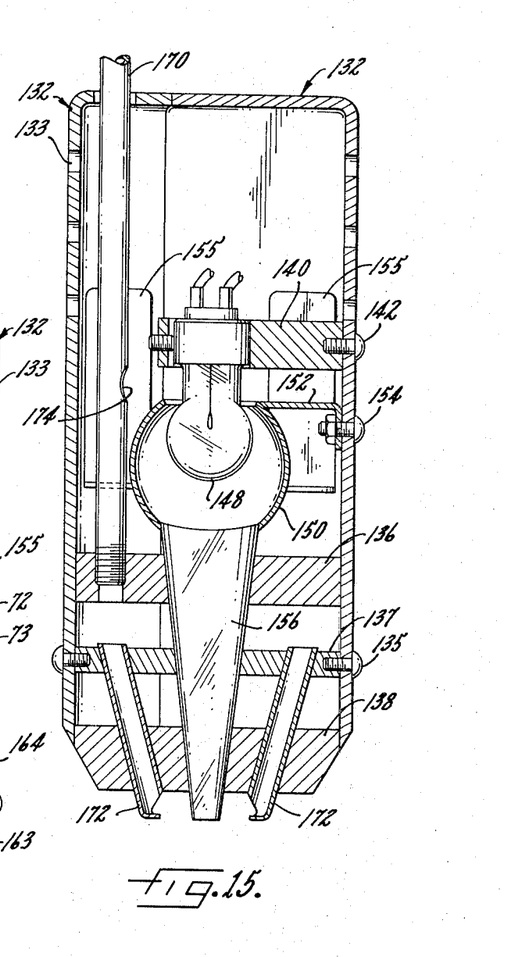
FIG. 15 is an enlarged longitudinal section taken on the line 15—15 of FIG. 13.

Another embodiment of the probe is shown in FIGS. 13–15 and comprises a housing formed from a pair of opposed shells 132 provided with vent openings 133 and closed at their rearward ends as at 134. Said shells are connected as by screws 135 to longitudinally spaced support blocks 136, 137, and 138, the block 138 enclosing the forward end of the probe housing. A bulb supporting bracket 140 is mounted in the probe by a screw 142 to support a low voltage high current bulb 148 providing the heat source for the probe. The energy from the bulb is directed forwardly through the probe by an elliptical reflector 150 having outwardly projecting legs 152 connected to one of the housing shells 132 by bolts 154 for supporting the reflector in the housing around the bulb. Conveniently, said reflector is also provided with a plurality of rearwardly projecting cooling fins 155 for dissipating the heat that is not reflected and directed forwardly through the probe.

The forward end of the reflector is connected to a frusto-conical fiber optic 156 having its rearward end supported in the forward end of the reflector 150 and projecting forwardly from said reflector through openings in the support blocks 136–138, with its forward end projecting outwardly beyond the end of the block 138. The optic 136 is comprised of a plurality of glass fibers each having a diameter of less than 0.0001 inch. Thus, the energy from the bulb 148 is reflected forwardly by the reflector 150 and focused through the probe by the optic 156 onto the work-piece.

A pair of thermal-sensing elements 158, for example thermistors, are equally spaced from the end of the optic 156 on opposite sides thereof and are supported on a pair of outwardly biased spring brackets 160 mounted on the forward face of the block 138 by screws 161. The spring brackets 160 bias the sensing elements forwardly of the probe to engage the surface of the work-piece to be tested on opposite sides of the point at which heat is applied to the work-piece through the optic 156. The sensing element leads 162 are carried in grommets 163 mounted in openings in the blocks 136–138 and are connected through stand-off terminals 164 to the lines 72 and 73 in the measuring circuit shown in FIG. 7 for measuring, in the same manner as previously described, the rate of temperature increase of the adjacent work-piece surface when the bulb is energized.

In order to prevent the spring brackets 160 from being compressed sufficiently to permanently distort them and/or to damage the optic 156 when the sensing elements are pressed against the work-piece, a pair of limit screws 166 are adjustably mounted in the block 138 and project forwardly therefrom. Said screws are releasably retained in the desired position of adjustment by lock nuts 168 received in said screws and disposed against the forward face of said bracket.

In order to concentrate the heat projected from the optic 156 and thermally insulate the sensing elements from said optic, an air conduit 170 is connected to a suitable source of air under pressure and projects through one of the shells 133 to dispose its discharge end in the space between the blocks 136 and 137. A plurality of forwardly converging air tubes 172 are mounted in the blocks 137 and 138 with the rearward ends of said tubes in open communication with the space between the blocks 136 and 137 and their forward ends disposed immediately adjacent the forward end of the optic 156 between said optic and the sensing elements 158. The conduit 170 is also provided with an opening 174 rearwardly of the block 136 to cause air to flow around the bulb 148 and reflector 150 for discharge out the vent openings 133 so as to prevent the housing from becoming overheated.

Figures 16, 17, 18:
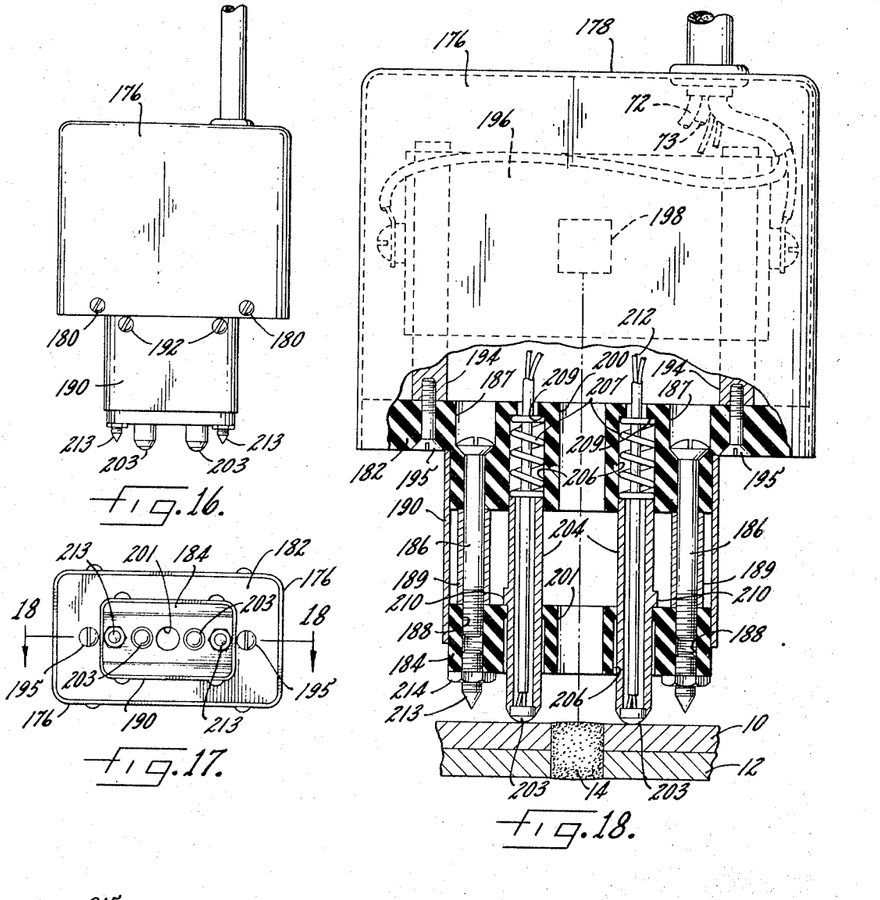
FIG. 16 is a side elevation of a modified form of the probe shown in FIG. 1.
FIG. 17 is an end elevation of the probe shown in FIG. 16.
FIG. 18 is an enlarged longitudinal section taken on the line 18—18 of FIG. 17.

Another embodiment of the probe is shown in FIGS. 16–18 and comprises a housing formed from a pair of opposed shells 176 closed at their rearward ends as at 178, and connected by screws 180 at their opposite ends to a support block 182. The support block is connected to an end block 184 by a pair of bolts 186 received in shouldered openings 187 in the block 182 and in openings 188 formed in the block 184. Desirably, a pair of sleeves 189 are disposed around the bolts 186 with their opposed ends disposed in abutting engagement with the adjacent faces of the blocks 182 and 184. A cowling 190 is connected to the blocks 181 and 184 by screws 192 to enclose the forward portion of the probe and the space between said blocks.

A pair of arms 194 are mounted on the rear face of the block 182 by screws 195. Said arms support a diode laser 196 whose crystal 198 projects a heat beam through aligned openings 200 and 201 formed in the blocks 182 and 184, respectively. The laser beam projects through the opening 201 onto the work-piece to be tested so that the rate of temperature increase of the work-piece can be measured.

To measure the rate of temperature change, a pair of thermal sensing elements 203, for example thermistors, are mounted in sleeves 204 equally spaced from, and disposed on opposite sides of, the block opening 201. Each of the sleeves 204 is slidably carried in aligned openings 206 in the blocks 184 and 182. A coil spring 207 is carried in the opening 206 in the block 182 with one of its ends abutting a shoulder 209 formed in said opening and its opposite end abutting the adjacent end of the sleeve 204 for thus biasing said sleeve and sensing element outwardly from the end block 184. The outward biasing movement of each of the sensing elements 203 is limited by a shoulder 210 formed on the sleeve 204 and engageable with the rear face of the block 184. The electrical leads 212 for the sensing elements 203 extend through the sleeves 204 and are operatively interconnected to the lines 72 and 73 of the measuring circuit shown in FIG. 7 for measuring, in the same manner previously described, the rate of temperature increase of the adjacent work-piece surface.

Rearward movement of the sensing elements in the probe is controlled and limited by a pair of limit screws 213 adjustably mounted in the end block openings 188 and projecting forwardly from said end block. Said screws are releasably retained in the desired position of adjustment by lock nuts 214 received on said screws and bearing against the forward face of the end black 184.

The probes shown in FIGS. 1–5, 9–12, 13–15, and 16–18 have been described as employing thermal-electric sensing elements such as thermistors. Thermocouples and other thermal-electric sensing devices whose properties change with temperature changes can also be employed. It is important, however, to employ sensing elements which use a design which provides the least amount of mass in order to achieve a fast response. It is also possible to use a sensing element which itself will indicate the rate of temperature change. Examples of such sensing elements are crystals made from $BaTiO_3$, or triglycrine sulfate and which are polarized before being used. These sensing elements which provide a pyroelectric effect for indicating directly the rate of temperature change produce a current which is expressed by the formula $$I = W \times K \times (dP_s T) \times (dT/dt)$$

wherein W is the heat power incident on the work-piece, K is a constant depending upon the heat capacity of the work-piece, $P_s$ is the saturation polarization, T is temperature, and $t$ is time.

Figure 19:
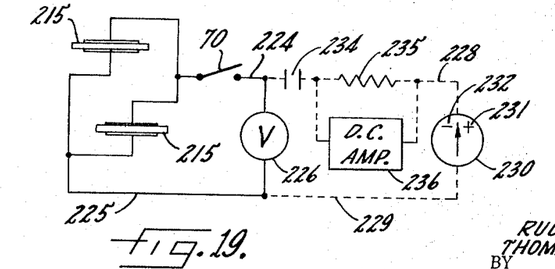
FIG. 19 is a wiring diagram for an electrical measuring circuit using sensing elements giving a direct rate of temperature change measurement.

Since sensors of this type provide a direct reading of the rate of temperature change, they may be employed with the circuitry shown in FIG. 19, wherein the crystals 215 are connected in parallel with each other. The two wires 224 and 225 from the electrodes of the crystals carrying a signal directly corresponding to the rate of temperature change are connected with a meter 226, which can be a vacuum tube voltmeter, indicating the rate of change. If a measurement of the sign of that rate of change is desired to be made, a pair of lines 228 and 229 can be connected across the meter 226 and across an ammeter 230 provided with indicia 231 and 232 for indicating whether the rate of the temperature change is increasing or decreasing. A differentiating amplifier circuit is disposed ahead of the ammeter 230 and comprises a capacitor 234 in series with a direct current amplifier 236 having a resistance 235 wired in parallel with it.

As previously indicated, the invention has been described as measuring the quality of a weld connection, but it is to be understood, of course, that the invention can determine the quality of any interconnection between two or more components, and the probes illustrated in FIGS. 9–12, 13–15, and 16–18, which use high intensity light sources as heat generation members, can be employed for measuring the quality of interconnection between both metallic and non-metallic members. Since the probe illustrated in FIGS. 1–5 requires the work-piece being tested to be electrically interconnected to the probe, said probe is adapted for use only with electrically conductive work-pieces.

Each of the heat sources in the probes shown in FIGS. 9–12, 13–15, and 16–18 is provided with an actuating switch such as the switch 60 shown in FIG. 6.

We claim:

1. A thermal testing apparatus, comprising a probe having a heat generative member carried therein for heating a localized area of a work-piece, a plurality of parallel wired thermal-electric sensing elements carried by said probe in equally spaced relation to said heat generative member and engageable with said work-piece at a plurality of points spaced from said area for sensing the temperature at said plurality of points, differentiating circuit means operatively connected to said sensing elements, and meter means connected to said differentiating circuit means for indicating the average rate of temperature change at said plurality of points, said differentiating circuit means including a capacitor and a direct current amplifier wired in series with each other between said sensing elements and meter means, and a resistance wired in parallel with said amplifier.

2. A thermal testing apparatus as set forth in claim 1 in which said thermal-electric sensing elements are thermistors.

3. A thermal testing apparatus as set forth in claim 1 in which said thermal-electric sensing elements are thermocouples.

4. A thermal testing apparatus, comprising a probe having a heat generative member carried therein for heating a localized area of a work-piece, a plurality of parallel wired thermal electric sensing elements carried by said probe in equally spaced relation to said heat generative member and engageable with said work-piece at a plurality of points spaced from said area for sensing the temperature at said plurality of points, and means operatively connected to said sensing elements for indicating the average rate of temperature change at said points, said sensing elements containing crystals adapted to generate a current according to the formula $$W \times K \times (dP_s/dT) \times (dT/dt)$$

wherein W is the heat power incident on the work-piece, K is the heat capacity of the work-piece, $dT/dt$ is the differential quotient of the temperature change versus time change, and $dP_s/dT$ is the differential quotient of the change of saturation of the polarization versus temperature change.

5. A thermal testing apparatus as set forth in claim 4 in which said crystals are polarized crystals selected from the class consisting of $BaTiO_3$, triglycrine sulfate, and the like.

6. A thermal testing apparatus, comprising a probe having a heat generative member carried therein for heating a localized area of a work-piece, a plurality of parallel wired thermal-electric sensing elements carried by said probe and engageable with said work-piece at a plurality of points spaced from said area for sensing the temperature at said plurality of points, and means operatively connected to said sensing elements for indicating the average rate of temperature change at said plurality of points, said means comprising an indicating circuit including an electric power source connected to a Wheatstone bridge one side of which comprises said sensing elements, an ammeter connected to said bridge for indicating the rate of temperature change at said points, a capacitor and a direct current amplifier wired in series with each other and interconnected between said bridge and ammeter, and a resistance wired in parallel with said amplifier.

7. A thermal testing apparatus, comprising a probe having a heat generative member carried therein for heating a localized area of a work-piece, a plurality of parallel wired thermal-electric sensing elements carried by said probe and engageable with said work-piece at a plurality of points spaced from said area for sensing the temperature at said plurality of points, and means operatively connected to said sensing elements for indicating the average rate of temperature change at said plurality of points, said means comprising an indicating circuit including an electric power source connected to a Wheatstone bridge one side of which comprises said sensing elements, a first ammeter connected to said bridge for indicating the rate of temperature change at said points, a first capacitor and first direct current amplifier wired in series with each other and interconnected between said bridge and first ammeter, a first resistance wired in parallel with said first amplifier, a second ammeter wired in parallel with said first ammeter for indicating the rate of rate of temperature change at said points, a second capacitor and second amplifier wired in series with each other between said first and second ammeters, and a second resistance wired in parallel with said second amplifier.

8. A thermal testing apparatus, comprising a probe having a heat generative member carried therein for heating a localized area of a work-piece, a plurality of parallel wired thermal electric sensing elements carried by said probe in equally spaced relation to said heat generative member and engageable with said work-piece at a plurality of points spaced from said area for sensing the temperature at said plurality of points, said sensing elements containing crystals adapted to generate a current according to the formula $I = W \times K \times (dP_s/dT) \times (dt/dt)$, wherein W is the heat power incident on the work-piece, K is the heat capacity of the work-piece, $dP_s/dT$ is the differential quotient of the change of saturation of polarization versus temperature change at said plurality of points and $dT/dt$ is the differential quotient of the temperature change versus time change, and an indicating circuit comprising one or more of said sensing elements and a meter connected across said sensing elements for indicating the rate of temperature change at said points.

9. A thermal testing apparatus as set forth in claim 8 with the addition that a second meter is wired in parallel with said meter for indicating the rate of rate of temperature change at said points, a capacitor and direct current amplifier are wired in series with each other between said two ammeters, and a resistance is wired in parallel with said amplifier.

10. In combination with a measuring circuit for indicating the rate of temperature change in a work-piece, a probe for applying heat to a localized area of said work-piece and sensing the temperature of said work-piece at points spaced from said area, said probe comprising a housing having a heating element carried therein for heating said localized area of the work-piece, a plurality of thermal sensing elements mounted in said housing in equally spaced relation to said heating element, said temperature sensing elements being wired in parallel and connected to a measuring circuit including meter means, biasing means independently biasing each of said temperature sensing elements outwardly from one end of said housing for sensing the temperature at said points on said work-piece, and a differentiating amplifier circuit in said measuring circuit and including a capacitor and direct current amplifier wired in series with each other between said sensing elements and meter means, and a resistance wired in parallel with said amplifier, whereby said meter means indicates the average rate of temperature change at said points.

11. The invention as set forth in claim 10 with the addition that adjustable limit screws are mounted on said housing and project outwardly from said one end of the housing adjacent said sensing elements.

References Cited
UNITED STATES PATENTS

| | | | |
|---|---|---|---|
| 2,587,705 | 3/1952 | DeForest | 73—15 |
| 2,733,598 | 2/1956 | Miner | 73—105 |
| 2,750,791 | 6/1956 | Hanysz et al. | 73—15 |
| 2,755,999 | 7/1956 | Vickers | 236—69 |
| 2,996,916 | 8/1961 | Smith | 73—341 |
| 3,053,091 | 9/1962 | Braunagel | 73—342 XR |
| 3,222,917 | 12/1965 | Roth | 73—15 |
| 3,243,792 | 3/1966 | Hamilton | 340—228 |

RICHARD C. QUEISSER, *Primary Examiner.*

JAMES J. GILL, *Examiner.*

J. C. GOLDSTEIN, EDDIE SCOTT,
*Assistant Examiners.*

UNITED STATES PATENT OFFICE

CERTIFICATE OF CORRECTION

Patent No. 3,369,389                          February 20, 1968

Rudi M. Schroeer et al.

It is certified that error appears in the above identified patent and that said Letters Patent are hereby corrected as shown below:

Column 3, line 21, after "to" insert -- a --. Column 5, line 14, "orfder" should read -- order --. Column 6, line 53, "theoptic" should read -- the optic --. Column 7, line 22, "181" should read -- 182 --.

Signed and sealed this 23rd day of September 1969.

(SEAL)
Attest:

Edward M. Fletcher, Jr.                      WILLIAM E. SCHUYLER, JR.

Attesting Officer                              Commissioner of Patents